Nov. 22, 1966   W. POSCHENRIEDER   3,287,669
ELECTROMECHANICAL BAND FILTER HAVING BRIDGING
CAPACITOR FOR PROVIDING ATTENUATION POLE
Filed Sept. 21, 1962   3 Sheets-Sheet 1

Inventor.
Werner Poschenrieder.
By [signature] Atty.

CASE a) WITHOUT $C_v$

CASE b)   $C_v \| W_l$ ; $\ddot{U} = 1:-1$

CASE c)   $C_v \| W_k$ ; $\ddot{U} = 1:+1$

Inventor:
Werner Poschenrieder.
By
Atty.

Inventor.
Werner Poschenrieder

United States Patent Office 3,287,669
Patented Nov. 22, 1966

3,287,669
ELECTROMECHANICAL BAND FILTER HAVING BRIDGING CAPACITOR FOR PROVIDING ATTENUATION POLE
Werner Poschenrieder, Munich, Germany, assignor to Siemens & Halske Aktiengesellschaft, Berlin and Munich, Germany, a corporation of Germany
Filed Sept. 21, 1962, Ser. No. 225,967
Claims priority, application Germany, Sept. 22, 1961, S 75,882
3 Claims. (Cl. 333—71)

The invention disclosed herein is concerned with an electromechanical band filter comprising $2n+1$ mechanical resonators ($n=1, 2, 3 \ldots$), wherein the first and the last mechanical resonator is respectively provided with two electrical terminals, and wherein electrical resonator circuits are provided in the input and output lines, respectively.

Electromechanical band filters which comprise, for example, a plurality of mechanically coupled quartz resonators or resonators made of other material, have been known for some time. Such filters have as a rule a relatively sharply delimited pass range, but it is difficult to steepen the flanks of such range. The U.S. Patent 2,774,042 proposes in connection with such a filter, for the solution of the problem involved, the formation of an attenuation pole, but such solution has the considerable drawback that the pole frequency is in a fixed ratio to the pass frequency, that is, it is not freely selectable. Accordingly, such measures are in practice avoided and the number of mechanical resonators is instead considerably increased.

The object of the invention resides in providing an arrangement wherein the formation of an attenuation pole, that is, a maximum of transmission attenuation is, in connection with an electromechanical filter with an odd number of resonators, selectively enforced in the upper or in the lower blocking or cutoff range.

According to the invention, this object is achieved by the provision of an electromechanical band filter with $(2n+1)$ mechanical resonators ($n=1, 2, 3 \ldots$), comprising means for providing the first and the last mechanical resonator respectively with two electrical terminals, means forming an electrical resonance circuit in the respective input line and output line, and means forming a capacitive overcoupling extending from the filter output to the filter input.

It is for the formation of an attenuation pole in the lower frequency blocking range desirable to provide the capacitive coupling between the terminals of the filter input and filter output, which are of opposite phase, while it is desirable, for the formation of the attenuation pole in the higher frequency range, to provide the capacitive coupling between the terminals of the filter input and filter output, which are on the same phase.

Further details and features of the invention will appear from the description of embodiments which is rendered below with reference to the accompanying drawings.

The invention is based upon recognition of the fact that an attenuation pole can be formed in simple manner by a voltage which is over a capacitor coupled in phase or in opposed phase from the output to the input of a mechanical filter. The pole frequency depends thereby upon the capacity of the capacitor. The greater this capacity is, the nearer will the pole frequency lie to the border of the pass band in the blocking region. The phase 0 or $\pi$ which is required for the formation of the pole may be readily adjusted by simple change of polarity, for example, by the selection of the appropriate terminal of the filter output.

As noted before, FIGS. 1 and 2 show two embodiments together with the transconductance curves respectively applying thereto.

Figure 1:
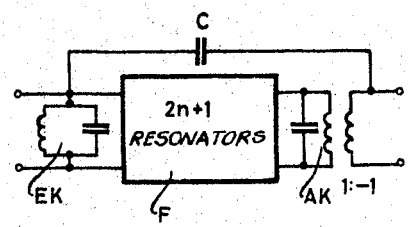
FIGS. 1 and 2 show two embodiments and the transconductance curves respectively applying thereto.
Figure 1:
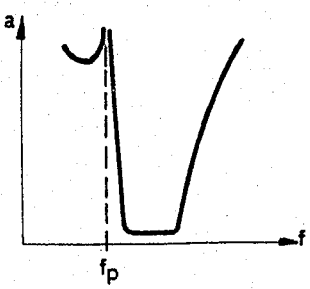

In FIG. 1, there is provided a mechanical filter F having an odd number of resonators. The end resonators of this mechanical filter, which is merely symbolically indicated, are provided with electrostrictive transducers, and the corresponding terminals are on the input and on the output side provided with parallel resonance circuits indicated respectively at EK and AK. Instead of these parallel resonance circuits, there may be provided series resonance circuits, at least at the input side. The output of the filter is provided with a transformer having a transformation ratio of $1:-1$. From the secondary winding of the transformer extends a capacitive coupling to the filter input, such coupling being in FIG. 1 assumed to be in opposed phase. The capacitive coupling extends over the capacitor C. In such a filter, as shown in FIG. 1, there will result the course of the transmission attenuation $a$, depending upon the frequency, that is, there will be formed an attenuation pole in the frequency-wise lower blocking range. The corresponding frequency is indicated at $f_\text{p}$.

Figure 2:
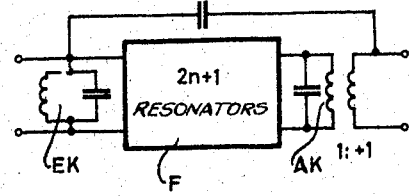
Figure 2:
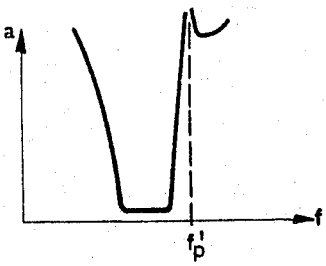

The circuit required for the formation of an attenuation pole in a frequency-wise higher blocking range, is represented in FIG. 2. The transformer at the output of the filter has here the transformation ratio $1:+1$, so that the capacitor coupling over the capacitor C is in the same phase. The pole frequency $f_\text{p}'$ will be in the frequency-wise higher blocking range.

The position of the pole frequency is in both cases determined by the capacity value of the capacitor C.

The transformer at the output of the filter may be omitted in both cases, provided that a terminal of the filter output is over the capacitor C directly connected with a corresponding opposing phase or identical phase terminal of the filter input, and that the two remaining terminals are directly connected through. The polarization of the phase of the output voltage can also be changed by reversal of the direction of polarization of the electromechanical transducer.

An analysis of such a filter has to proceed from Bartlett's rule, since mechanical filters can usually be split by sectioning into two mirror-symmetrical halves. The extended Bartlett rule is to be applied in the case of an opposed phase overcoupling, such extended rule making it possible to change a mirror-symmetrical filter into a bridge filter.

Figure 3:
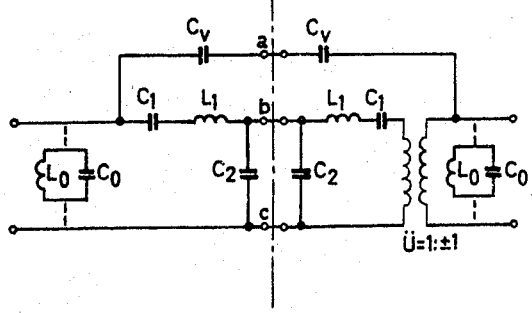
FIG. 3 shows a substitution circuit for a mechanical filter with two resonators.
Figure 3:
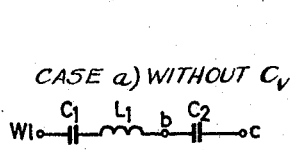
Figure 3:
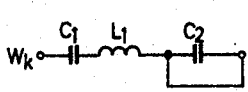
Figure 3:
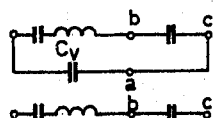
Figure 3:
Figure 3:
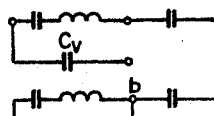
Figure 3:
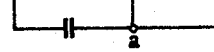
Figure 3:
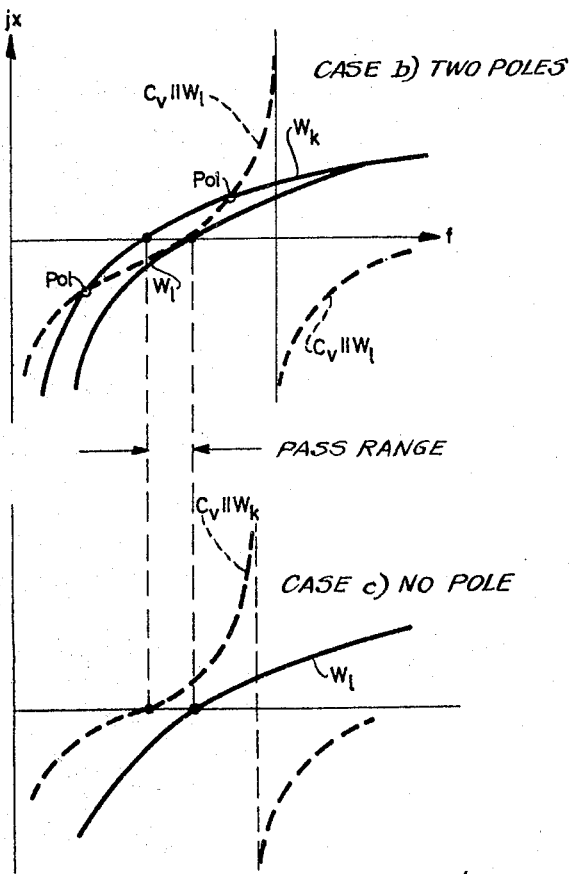

Attenuation poles appear when the bridge reactances become equal. It is accordingly necessary to find out whether the branches of the filter that has been changed to a bridge, become equal, and where they become equal. FIG. 3 shows for this purpose the equivalent circuit of a mechanical filter having two resonators, which has been split into two equal parts. The electrical end circuits $L_0C_0$ of the mechanical filter do not produce any attenuation poles. They can therefore be split off and the core of the filter alone can be treated according to Bartlett's rule, ignoring for the time being $C_\text{v}$.

The course of the reactance of the bridge circuit thus obtained reveals the following:

(a) $W_\text{k}$ always extends over $W_1$; $W_\text{k}$ and $W_1$ do not intersect.

(b) Upon switching $C_\text{v}//W_1$, two intersecting points must appear with $W_\text{k}$, one in the upper and one in the lower blocking range.

(c) No intersecting points are produced with $W_1$ upon switching $C_\text{v}//W_\text{k}$.

$C_v$ can be placed on $W_1$ or on $W_k$, by appropriate selection of the phase of the overcoupling. Upon coupling with the phase O, the simple Bartlett rule is to be applied and $C_v$ will lie at $//W_k$ (case $c$ above). However, when employing the phase $\pi$, the extended Bartlett rule is to be applied, and $C_v$ will lie at $//$ to $W_1$ (case $b$ above).

Figure 4:
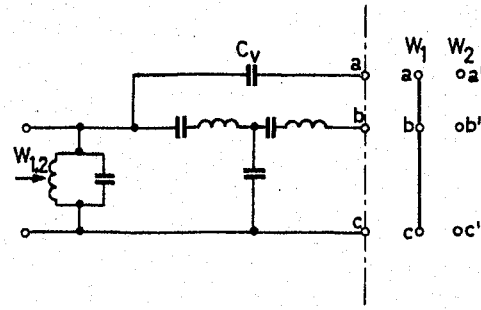
FIG. 4 shows a substitution circuit for a resonator with three mechanical filters.
Figure 4:
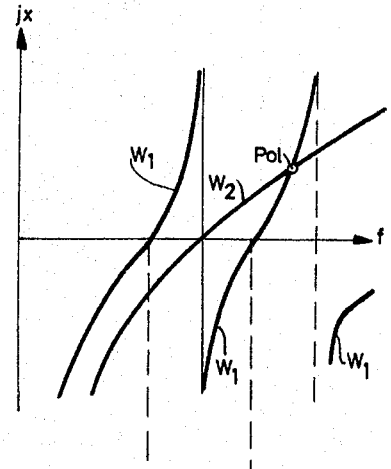
Figure 4:
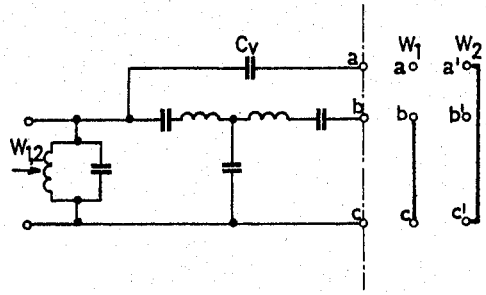
Figure 4:
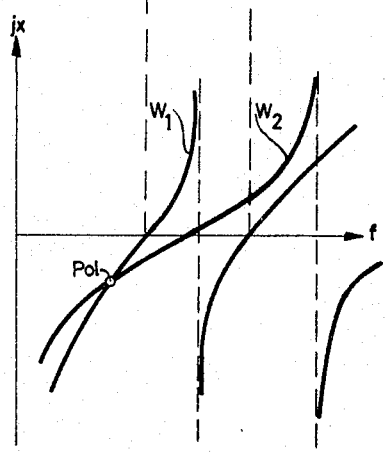

As is apparent from FIG. 4, the situation will be considerably different when there are three mechanical resonators. In such event, an intersecting point will appear in each case, that is, a pole will be obtained upon cophasal overcoupling, in the frequency-wise higher blocking range, while a pole will be obtained upon opposed phase overcoupling, in the frequency-wise lower blocking range.

The reasons why the cases, resonator number $n=2$ and $n=3$, differ so greatly, obviously reside in the following: Upon writing the condition for the identity of the reactances, there will be obtained as a determining equation a polynom $\omega^2$ which contains $\omega^{2n}$ as highest power, whereby $n$ is the number of resonators. In the event that $n$ is an odd number $n=1, 3, 5$, etc., this polynom has according to algebraic rules at least a real solution for $\omega^2$. For $n=2, 4, 6$, etc., there may not appear any real solution, that is, there will not be a pole. One real solution alone is impossible; there must appear at least two real solutions, that is, two poles. This means, that no pole or (at least) two poles will be formed by $C_v$ in the case of all even resonator numbers, depending upon the phase of the overcoupling, while a pole appears in any event, in the case of all odd resonator numbers. So far as the courses of the branch reactances in the blocking range at higher resonator numbers is concerned, there will not occur any essential change as compared with the case $n=2$ and $n=3$, that is, the number of intersecting points and the position thereof respectively in the left and in the right blocking range, will be retained. The minimum numbers of poles appearing, namely, respectively one or two, are accordingly not exceeded even in the presence of a greater number of resonators.

Changes may be made within the scope and spirit of the appended claims which define what is believed to be new and desired to have protected by Letters Patent.

I claim:
1. An electromechanical band filter with $(2n+1)$ mechanical resonators ($n=1, 2, 3, \ldots$), comprising means forming two electrical terminals respectively for the first and for the last mechanical resonator, electrical resonance circuits disposed respectively in the input line and in the output line of the filter, and means forming a capacitive overcoupling extending from the filter output to the filter input to form an attenuation pole lying in the blocking range at one side of the pass band of the filter.

2. An electromechanical band filter according to claim 1, wherein said capacitive overcoupling extends between terminals of opposite phase, so as to form an attenuation pole lying in the frequency-wise lower blocking range.

3. An electromechanical band filter according to claim 1, wherein said capacitive overcoupling extends between terminals of identical phase, so as to form an attenuation pole lying in the frequency-wise higher blocking range.

References Cited by the Examiner

UNITED STATES PATENTS

| | | | |
|---|---|---|---|
| 2,199,921 | 5/1940 | Mason | 333—72 |
| 2,249,440 | 7/1941 | Sykes | 333—72 |
| 2,308,397 | 1/1943 | Starr | 333—72 |
| 2,345,941 | 3/1944 | Mason | 333—72 |
| 2,443,471 | 6/1948 | Mason | 333—72 |
| 2,452,114 | 10/1948 | Farkas | 333—72 |
| 2,814,785 | 11/1957 | Burns | 333—72 |
| 3,015,789 | 1/1962 | Honda et al. | 333—72 |
| 3,064,213 | 11/1962 | Mason | 333—71 |

HERMAN KARL SAALBACH, *Primary Examiner.*

C. BARAFF, *Assistant Examiner.*